United States Patent
Horiuchi

(10) Patent No.: US 9,254,601 B2
(45) Date of Patent: Feb. 9, 2016

(54) TEMPERATURE MONITORING DEVICE FOR INJECTION MOLDING MACHINE

(71) Applicant: FANUC Corporation, Yamanashi (JP)

(72) Inventor: Atsushi Horiuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 14/303,452

(22) Filed: Jun. 12, 2014

(65) Prior Publication Data

US 2014/0370139 A1    Dec. 18, 2014

(30) Foreign Application Priority Data

Jun. 13, 2013   (JP) .................................. 2013-124475

(51) Int. Cl.
B29C 45/78    (2006.01)
B29C 45/84    (2006.01)
B29C 45/72    (2006.01)
B29C 45/74    (2006.01)
B29C 45/76    (2006.01)

(52) U.S. Cl.
CPC .................. B29C 45/78 (2013.01); B29C 45/72 (2013.01); B29C 45/84 (2013.01); *B29C 45/74* (2013.01); *B29C 45/76* (2013.01); *B29C 2945/7604* (2013.01); *B29C 2945/7618* (2013.01); *B29C 2945/76652* (2013.01); *B29C 2945/76658* (2013.01); *B29K 2901/00* (2013.01)

(58) Field of Classification Search
CPC ........ B29C 45/78; B29C 45/84; B29C 45/72; B29C 45/76; B29C 45/74; B29C 2945/7618; B29C 2945/7604; B29C 2945/76658; B29C 2945/76652

USPC ................... 425/151, 190, 547, 551, DIG. 45
See application file for complete search history.

(56) References Cited

U.S. PATENT DOCUMENTS 6,520,761 B2 *    2/2003    Arai ........................ B29C 45/84
                                                                    425/136

FOREIGN PATENT DOCUMENTS

| JP | 1-249421 A | 10/1989 |
| JP | 5-88261 A | 4/1993 |
| JP | 5-269797 A | 10/1993 |
| JP | 7-186232 A | 7/1995 |
| JP | H09-1613 A | 1/1997 |
| JP | 2000-108187 A | 4/2000 |
| JP | 2003-191308 A | 7/2003 |
| JP | 2007-225019 A | 9/2007 |
| JP | 2009-56645 A | 3/2009 |

OTHER PUBLICATIONS

Decision to Grant a Patent mailed Oct. 21, 2014, corresponding to Japanese patent application No. 2013-124475.

* cited by examiner

*Primary Examiner* — Joseph S Del Sole
*Assistant Examiner* — Thukhanh T Nguyen
(74) *Attorney, Agent, or Firm* — Hauptman Ham, LLP

(57) ABSTRACT

A temperature monitoring device for an injection unit of an injection molding machine is provided with a heater to heat a nozzle and a heating cylinder, a temperature sensor to detect a current temperature of the nozzle and the heating cylinder or around the heating cylinder, and an electromagnetic locking device to prohibit a safety door from opening when the current temperature detected by the temperature sensor exceeds a predetermined opening operation prohibited temperature.

6 Claims, 5 Drawing Sheets

TEMPERATURE MONITORING DEVICE FOR INJECTION MOLDING MACHINE

RELATED APPLICATIONS

The present application claims priority to Japanese Application Number 2013-124475, filed Jun. 13, 2013, the disclosure of which is hereby incorporated by reference herein in its entirety.

BACKGROUND OF THE INVENTION

1. Field of the Invention

The present invention relates to a temperature monitoring device for a heating cylinder of an injection molding machine.

2. Description of the Related Art

In general, an injection device of an injection molding machine comprises a heating cylinder and a nozzle. The heating cylinder is used to heat and melt a molding resin and maintain the molten state of the resin. The nozzle is attached to the distal end of the heating cylinder and serves to inject the resin melted in the heating cylinder into the cavity of a mold. The temperatures of the heating cylinder and the nozzle are controlled without deviation to a preset temperature such as to maintain the molten state of the resin, by using temperature measuring unit such as a thermocouple or heating unit such as a heater. The necessary temperature of the heating cylinder for the maintenance of the molten state of the resin is determined to be, for example, 200 to 450° C., depending on the type of the resin. A stable molding operation can be continuously performed by maintaining this necessary temperature.

If an operator touches the heating cylinder or the nozzle at such a high temperature as to molt the resin, during the molding operation or in a stop mode, he/she may possibly get burned. In some cases, moreover, the resin heated and melted in the heating cylinder may be ejected from the nozzle, and the operator may be burned by touching the ejected resin.

Conventionally, a protective cover as a unit configured to covert a heating cylinder to avoid the possibility of a burn or the like described above is attached to the heating cylinder (Japanese Patent JPH9-1613A and JP2000-108187A). During a molding operation, however, a resin melted in the heating cylinder is injected into the cavity of a mold through the tip of a nozzle. Therefore, the operation must be performed with an injection device advanced by the drive of a nozzle-touch motor or a hydraulic device and with the nozzle on the distal end of the heating cylinder pressed against the mold on a stationary platen of an injection molding machine. Accordingly, part of the heating cylinder or the nozzle is not covered by the protective cover.

In some cases, therefore, openable safety doors are attached around a heating cylinder or a nozzle. Some openable safety doors are designed to entirely cover a heating cylinder and a nozzle or an injection device. Other openable safety doors are designed to cover a heating cylinder and a nozzle only partially.

In a technique disclosed in Japanese Patent JP2007-225019A, a machine is provided with an electromagnetic lock as a unit configured to lock openable safety doors. The operation of this machine can be stopped to release the electromagnetic lock by opening the safety doors. According to this technique, the electromagnetic lock can be released to allow the safety doors to open when the machine is stopped. If the machine is stopped so that the safety doors can be opened, however, the temperature of the heating cylinder is not always reduced to a safe level.

Specifically, even if temperature control by heating devices is suspended as the operation is stopped, the current temperature of the heating cylinder continues to be high for a while and will not be reduced to a safe level such that an operator can touch the cylinder. Further, it is necessary to start the temperature control of the heating cylinder by the heating devices before the start of the operation so that the resin in the heating cylinder is melted in advance. In some cases, therefore, the heating cylinder may stay hot even when the machine is stopped.

Japanese Patent JP2003-191308A discloses a technique in which a display device displays an indication to the effect that a heating cylinder is hot or an operation command to lock safety doors. However, there is no disclosure to the effect that the safety doors should be locked based on the current temperature of the heating cylinder.

In the prior art techniques, as described above, the safety doors can be opened and closed without considering the current temperature of the heating cylinder or the nozzle, so that the possibility of an operator getting burned by touching the heating cylinder cannot be eliminated.

SUMMARY OF THE INVENTION

Accordingly, the object of the present invention is to provide a temperature monitoring device configured to monitor the current temperature of a heating cylinder or a nozzle and to lock and prohibit a safety door from opening if the current temperature of the heating cylinder or the nozzle exceeds a predetermined opening operation prohibited temperature, whereby the possibility of an operator getting burned by touching the heating cylinder or the nozzle can be eliminated to ensure safety.

A temperature monitoring device for an injection molding machine according to the present invention is provided with a heating cylinder covered by an openable shield. The temperature monitoring device comprises a heating unit configured to heat the heating cylinder, a detecting unit configured to detect a current temperature of or around the heating cylinder, a storage unit configured to store a prohibited temperature at which the shield is prohibited from opening, and a prohibition unit configured to prohibit the shield covering the heating cylinder from opening if the detected current temperature exceeds the prohibited temperature.

The temperature monitoring device may comprise a zone temperature detecting unit configured to set a plurality of zones over the heating cylinder and detect the current temperature for each of the zones and an average temperature obtaining unit configured to obtain an average of current temperatures for the zones or around the heating cylinder, and the shield covering the heating cylinder may be prohibited from opening if the average temperature exceeds the prohibited temperature.

The temperature monitoring device may comprise a zone temperature detecting unit configured to set a plurality of zones over the heating cylinder and detect the current temperature for each of the zones and a maximum temperature obtaining unit configured to obtain a maximum of current temperatures for the zones or around the heating cylinder, and the shield covering the heating cylinder may be prohibited from opening if the maximum temperature exceeds the prohibited temperature.

The temperature monitoring device may issue a warning while the shield is being prohibited from opening.

The temperature monitoring device may issue a warning at the point in time when the shield is to be opened while the shield is being prohibited from opening.

The temperature monitoring device may comprise a unit configured to cancel the state in which the shield is prohibited from opening while the shield is being prohibited from opening.

According to the present invention arranged in this manner, there can be provided a temperature monitoring device in which the current temperature of a heating cylinder or a nozzle is monitored without regard to the state of an injection molding machine, whether operating or stopped, and a safety door is locked to be prohibited from opening if the current temperature of the heating cylinder or the nozzle exceeds a predetermined opening operation prohibited temperature, whereby the possibility of an operator getting burned by touching the heating cylinder or the nozzle can be eliminated to ensure safety.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
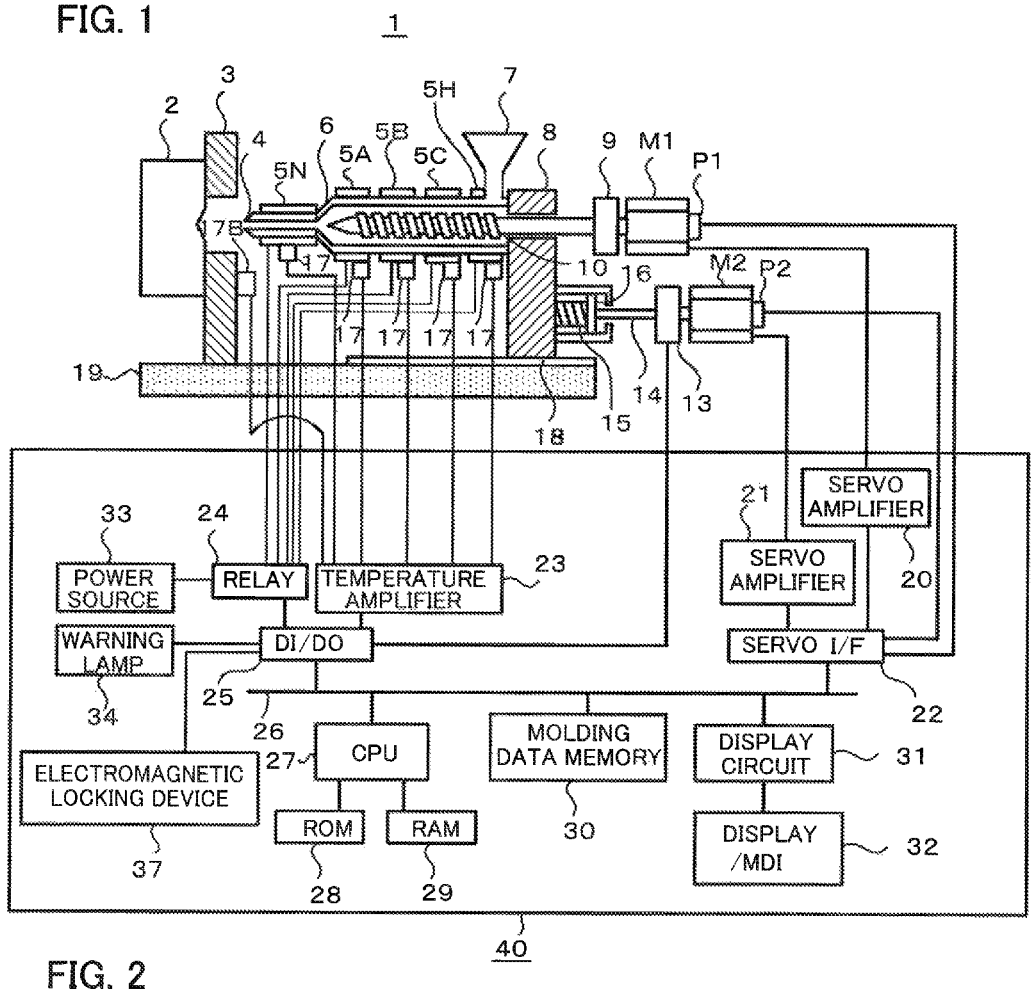
FIG. 1 is a diagram illustrating configurations of an injection device of an injection molding machine and a temperature monitoring device.

FIG. 1 shows configurations of an injection device of an injection molding machine and a temperature monitoring device.

The injection molding machine comprises the injection device and a mold clamping device disposed on a machine base. A description of the mold clamping device is omitted. Numeral 1 denotes the injection device of the injection molding machine. The injection device 1 comprises a heating cylinder 6 fitted with a nozzle 4, a front plate 8 fitted with the heating cylinder 6, an injection motor M1, and a nozzle-touch motor M2. A resin-base material in a hopper 7 is fed into the heating cylinder 6. A mold 2 is secured to a stationary platen 3 formed with a central through-hole through which the nozzle 4 of the heating cylinder 6 is passed.

The stationary platen 3 and a rail 18 for the movement of the injection device 1 are arranged on a base frame 19. The injection device 1 is slidable horizontally in FIG. 1 on the rail 18. The nozzle 4 attached to the distal end of the heating cylinder 6, which can advance and retreat relative to the mold 2, contacts a sprue bushing (not shown) of the mold 2 as the heating cylinder 6 advances. The injection motor M1 is secured by a structure (not shown) such that it is kept from moving relative to the front plate 8. The nozzle-touch motor M2 is secured by a structure (not shown) such that it is kept from moving relative to the base frame 19.

A shaft 14 is a ball screw, which threadedly engages a nut (not shown) and moves to the left in FIG. 1 as the nozzle-touch motor M2 rotates forward. When the shaft 14 moves in this manner, the front plate 8 is urged to move to the left along the drawing plane of FIG. 1 by a spring shoe 16 and a spring 15. Thereupon, the nozzle 4 attached to the heating cylinder 6 contacts the sprue bushing (not shown). The nozzle-touch motor M2 is rotated so that a pressure contact force F with which the nozzle 4 presses the mold 2 has a predetermined magnitude. In order to set the nozzle-touch pressure contact force F to a predetermined magnitude, a driving current for driving the nozzle-touch motor M2 is detected by a current detection unit (not shown). If the detected driving current reaches or exceeds a driving current corresponding to a predetermined pressure contact force Fs, a brake 13 is activated to lock the nozzle-touch motor M2. Thus, even though the current supply to the nozzle-touch motor M2 is cut off, the nozzle 4 continues to be pressed against the mold 2 by elastic energy accumulated in the spring 15.

If the nozzle-touch motor M2 rotates reversely to move the spring shoe 16 to the right in FIG. 1, the nozzle 4 is separated from the mold 2.

A screw 10 is passed through the heating cylinder 6. A nozzle heater 5N is mounted on the nozzle 4, and heaters 5A, 5B, 5C and 5H on the heating cylinder 6. The heaters 5A, 5B and 5C are heaters for first, second, and third zones, respectively. The heaters 5H and 5N are heaters for a material supply zone and a nozzle unit, respectively. As shown in FIG. 1, the heaters 5A, 5B, 5C, 5H and 5N mounted on the nozzle 4 and the heating cylinder 6 are separately provided in a plurality of heating zones so that the nozzle 4 and the heating cylinder 6 can be heated separately.

Temperature sensors 17 are attached to the nozzle 4 and the heating cylinder 6. The temperature sensors 17 are mounted corresponding to the heating zones of the nozzle 4 and the heating cylinder 6. The screw 10 is fitted with a pressure sensor 9, such as a load sensor, which detects a pressure applied to the screw 10 to measure the resin pressure in the heating cylinder 6.

In the description to follow, the nozzle and the heating cylinder will be collectively referred to as the "heating cylinder".

As shown in FIG. 1, the temperature sensors 17 of heating devices attached to the heating cylinder 6 may be used as temperature detectors for measuring the temperature of the heating cylinder 6. If a dedicated sensor is newly added as a temperature detector, moreover, this temperature detector can be located in a position different from those of the temperature sensors 17 mounted on the heating devices, that is, the heaters 5A, 5B, 5C, 5H and 5N. For example, the additional temperature detector can be located in a position on the heating cylinder 6 where the temperature is the highest.

The screw 10 comprises mechanisms, such as pulleys, belt, ball screw/nut mechanism, etc., which convert rotary motion to linear motion by means of the injection motor M1. The screw 10 is driven to move axially by a transmission mechanism (not shown). Symbol P1 denotes a position/speed detector, which detects the position and speed of the screw by detecting those of the injection motor M1.

A control device 40 of the injection molding machine with the temperature monitoring device comprises a CPU 27, which represents processors including a microprocessor CNCCPU for numerical control, a PMCCPU for a programmable machine controller, and a servo CPU for servo control.

A ROM 28 is stored with an automatic operation program for generally controlling the injection molding machine, a dedicated control program for servo control, a sequential program for controlling the sequential operation of the injection molding machine, etc. Further, a RAM 29 is used to temporarily store data.

The CPU 27 is connected with servo amplifiers 20 and 21 through a servo interface 22. The servo amplifiers 20 and 21 drive the injection and nozzle-touch motors M1 and M2 based on commands from the CPU 27. The position/speed detector P1 and a position/speed detector P2 are incorporated in the injection and nozzle-touch motors M1 and M2, respectively. Output signals from these detectors P1 and P2 are fed back to the CPU 27. The respective rotational positions of the motors M1 and M2 are obtained based on the feedback signals from the detectors P1 and P2, updated, and stored in their corresponding current position storage registers. FIG. 1 shows only those configurations which are related to the injection and nozzle-touch motors M1 and M2.

The CPU 27 is connected with the pressure sensor 9 through an analog-to-digital (A/D) converter (not shown) so that a pressure signal from the pressure sensor 9 can be detected. A molding data memory 30 composed of a nonvolatile memory serves to store molding conditions related to injection molding operation, various set values, parameters, etc.

Figure 2:
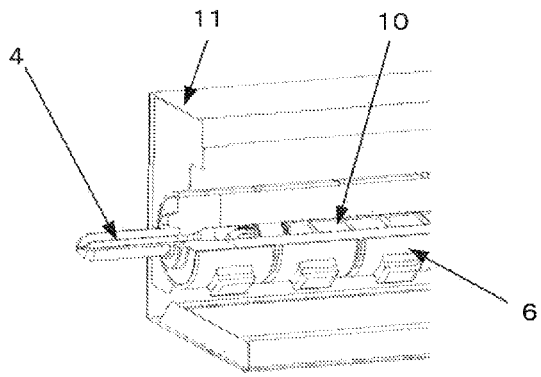
FIG. 2 is a view illustrating a protective cover configured to cover the heating cylinder.

A display/MDI 32 is connected to a bus 26 through a display circuit 31. It is provided with a ten-key pad for inputting numerical data and various function keys, which can be operated to select graph display screens and function menus and input various data. For example, a temperature setting screen for the heating cylinder 6 shown in FIG. 2 is displayed on a display screen of the display/MDI 32. Further, a preset temperature Ts for molding operation can be input by means of the ten-key pad of the display/MDI 32.

An I/O interface 25 serves to receive temperature signals detected by the temperature sensors 17 on the nozzle 4 and the heating cylinder 6 of the injection molding machine through a temperature amplifier 23. The I/O interface 25 also serves to output a control signal for controlling power supply, from a power source 33 to the heaters 5 on the nozzle 4 and the heating cylinder 6, to a relay 24.

The CPU 27 performs PID control or the like of the heaters 5A, 5B, 5C, 5H and 5N separately arranged in a plurality of heating zones on the nozzle 4 and the heating cylinder 6, based on the preset temperature Ts for molding operation and temperatures detected by the temperature sensors 17, for each heating zone. In this way, heating in the heating zones is controlled and adjusted to the preset temperature Ts for molding operation. Thus, the nozzle 4 and the heating cylinder 6 are temperature-controlled so that a current temperature Tr of the heating cylinder 6 is continually measured by the temperature sensors 17 and made coincident with the preset temperature values of the heaters 5A, 5B, 5C, 5H and 5N, as indicated on the temperature setting screen for the heating cylinder 6 shown in FIG. 5.

Figure 3:
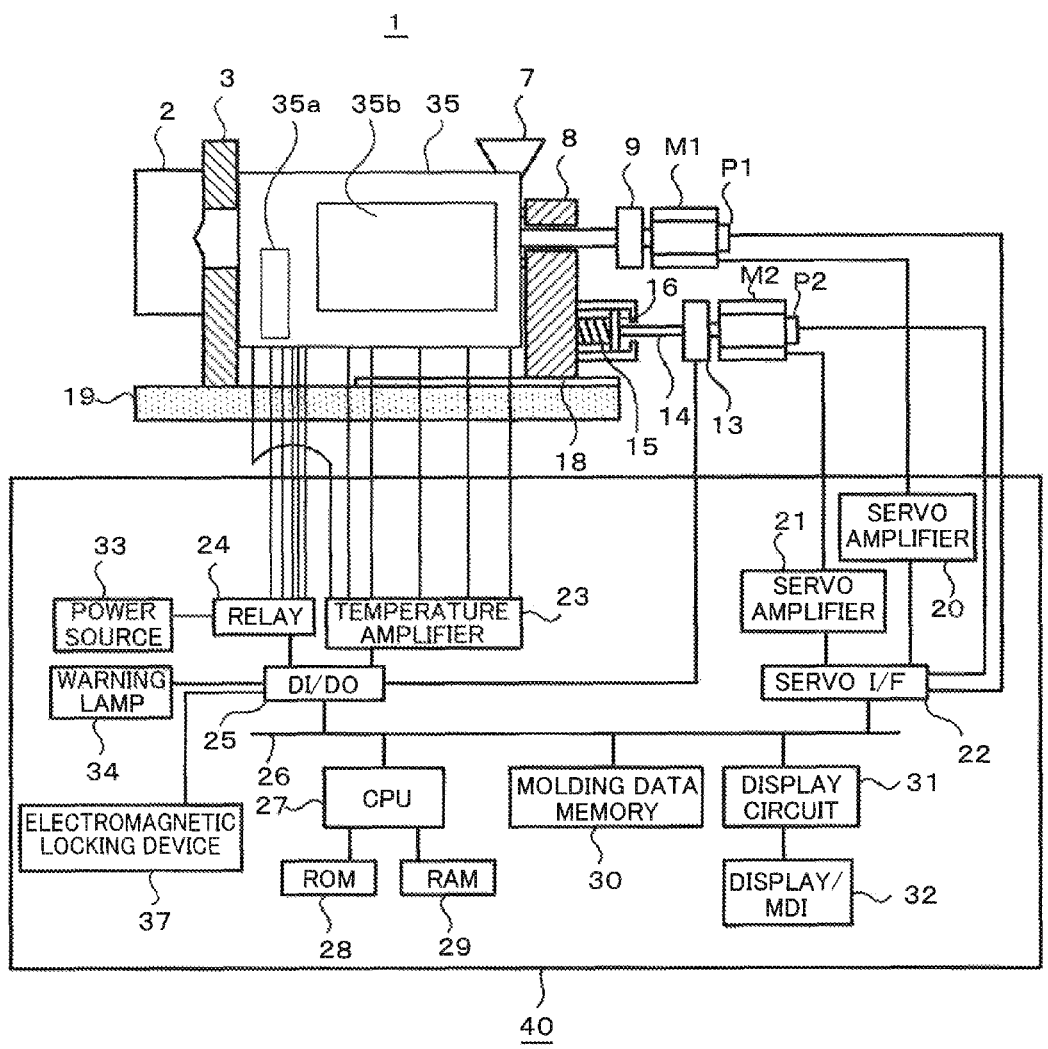
FIG. 3 is a diagram illustrating an example of a safety door as an openable shield that entirely covers the heating cylinder and a nozzle.
Figure 4:
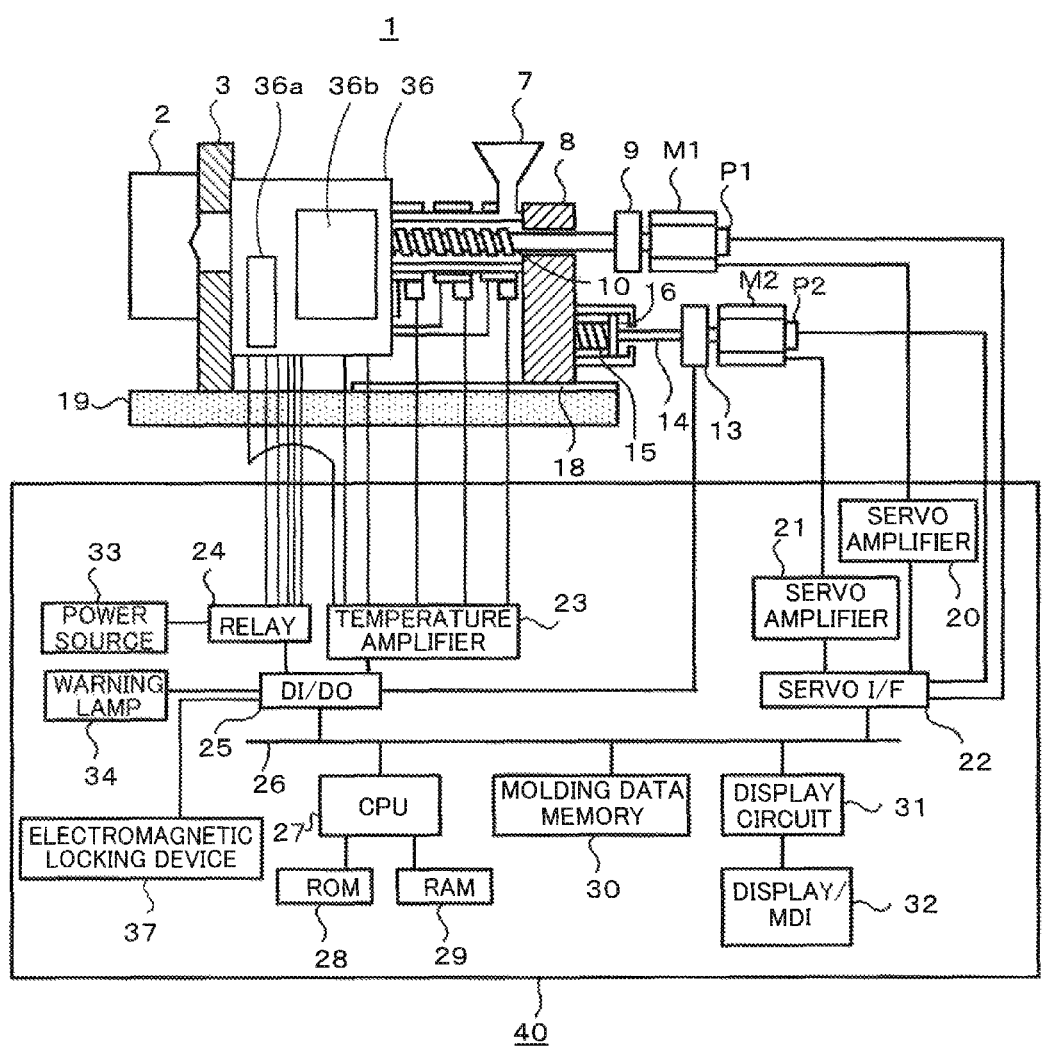
FIG. 4 is a diagram illustrating an example of a safety door as an openable shield that only partially covers the heating cylinder and the nozzle.

FIG. 2 shows a protective cover 11 configured to cover the heating cylinder 6. The nozzle 4 attached to the distal end of the heating cylinder 6 is not covered by the protective cover 11. The screw 10 is inserted into the heating cylinder 6. FIG. 3 shows an example of a safety door 35 as an openable shield that entirely covers the heating cylinder 6 and the nozzle 4. The safety door 35 is provided with a door handle 35a and an observation window 35b. FIG. 4 shows an example of a safety door 36 as an openable shield that only partially covers the heating cylinder 6 and the nozzle 4. The safety door 36 is provided with a door handle 36a and an observation window 36b.

Figure 5:
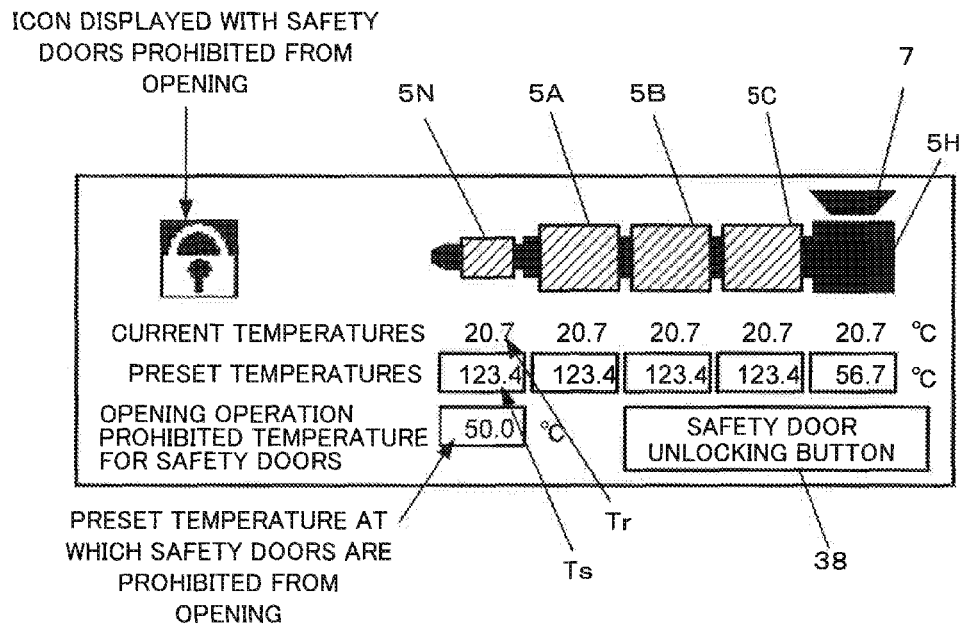
FIG. 5 shows examples of a temperature setting screen for the heating cylinder and a setting screen for an opening operation prohibited temperature for the safety doors.

An opening operation prohibited temperature at which the safety doors 35 and 36 shown in FIGS. 3 and 4 are prohibited from opening may be set through the operation screen of the display/MDI 32, as shown in FIG. 5. Alternatively, a predetermined temperature may be set in advance in the molding data memory 30 of the temperature monitoring device or the control device 40, as shown in FIG. 1.

An electromagnetic locking device 37 or a hydraulic locking device (not shown) is used as a unit configured to hold the open/close state of the safety doors 35 and 36, thereby prohibiting the doors from opening. The locking and unlocking operations of the safety doors 35 and 36 by means of the electromagnetic locking device 37 or the hydraulic locking device are controlled by a DO signal from the control device 40. When the electromagnetic locking device 37 is unlocked, as shown in FIGS. 3 and 4, the safety doors 35 and 36 can be opened by operating the door handles 35a and 35b thereon.

Figure 6:
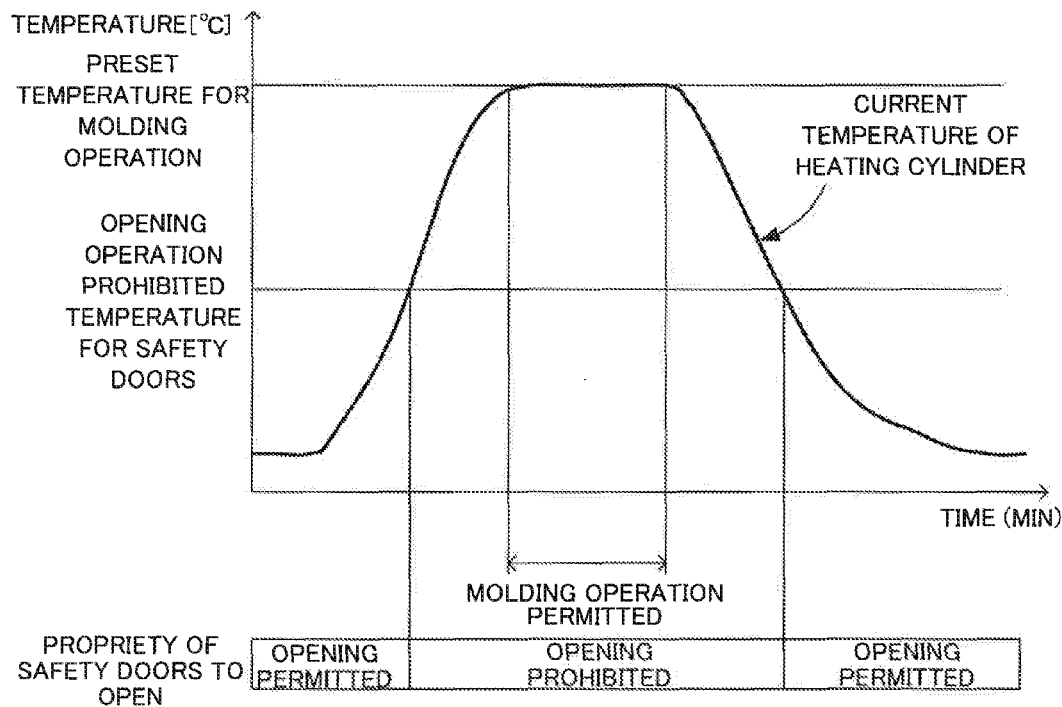
FIG. 6 is a diagram illustrating the relationship between the propriety of the safety doors to open and the temperature of the heating cylinder.

If the current temperature detected by the temperature sensors 17, e.g., thermocouples, attached to the heating cylinder 6 or the nozzle 4 exceeds the opening operation prohibited temperature for the safety doors 35 and 36, as shown in FIG. 6, the temperature monitoring device or the control device 40 drives the electromagnetic locking device 37 to lock the safety doors 35 and 36 that cover the heating cylinder 6, thereby prohibiting the safety doors 35 and 36 from opening.

If the current temperature of the heating cylinder 6 or the nozzle 4 becomes lower than the opening operation prohibited temperature for the safety doors 35 and 36, the safety doors 35 and 36 may be unlocked so that they are allowed to open and close.

If only the temperature sensors 17 of the heating devices attached to the heating cylinder 6 are used as a unit configured to detect the current temperature of the heating cylinder 6, moreover, a new temperature sensor need not be additionally used, so that there is no cost increase.

Furthermore, the ambient temperature of the heating cylinder may be used as the current temperature. As shown in FIG. 1, for example, the current ambient temperature of the heating cylinder may be measured by means of a temperature sensor 17B, e.g., a thermocouple, newly attached to a shield, such as the safety door 35 or 36, the protective cover 11 that covers the heating cylinder 6, or the stationary platen 3.

The current temperature of the heating cylinder 6 may be an average or maximum value of current temperatures obtained by a plurality of temperature sensors of the heating cylinder 6, e.g., the temperature sensors 17 attached to the heaters 5A to 5C in the first to third zones. The average or maximum value of the current temperatures may be calculated based on the current temperature obtained by the temperature sensor attached to the shield, such as the safety door 35 or 36, or the stationary platen 3, as well as the current temperatures in the plurality of zones of the heating cylinder 6. FIG. 1 shows an example of the control device 40 in which the temperature sensor 17B for the ambient temperature of the heating cylinder is attached to the stationary platen 3.

According to a specific example of a method of current temperature calculation, if the temperature sensor is attached to the stationary platen 3 with the heating cylinder divided into three zones, the average or maximum value of the current temperatures can be obtained by equation (1) as follows:

$$\text{Average value of current temperatures} = \text{Average}(\text{Temp 1}, \text{Temp 2}, \text{Temp 3}, \text{Temp } B),$$

$$\text{Maximum value of current temperatures} = \text{Max}(\text{Temp 1}, \text{Temp 2}, \text{Temp 3}, \text{Temp } B), \quad (1)$$

where Temp N (N=1, 2 and 3) is current temperatures in a plurality of zones N of the heating cylinder, and Temp B is the current ambient temperature of the heating cylinder, e.g., the current temperature of the stationary platen.

While the safety doors 35 and 36 are being prohibited from opening, a warning message "HEATING CYLINDER IS TOO HOT TO OPEN SAFETY DOORS" is displayed on the display/MDI 32. The warning message may be displayed the moment the opening operation prohibited temperature is exceeded by the current temperature of the heating cylinder 6 or when the safety doors 35 and 36 are opened at a temperature higher than the opening operation prohibited temperature. As shown in FIG. 5, moreover, a warning icon may be displayed in place of the warning message on the display/MDI 32.

Instead of the warning message, moreover, a warning signal may be output through an input/output circuit to sound a warning buzzer, or a warning lamp 34 or an electric notice board may be turned on.

In preparatory work before the molding operation or maintenance work after the molding operation, the screw 10 in the heating cylinder 6 is rotated, advanced, or retreated to discharge the resin staying in the heating cylinder 6 or adhering to the screw 10 or the inner wall of the heating cylinder. In this way, the resin is purged from the heating cylinder 6 through the nozzle 4. The resin thus discharged by purging accumulates on the base frame 19. If the amount of the resin on the base frame exceeds a tolerance, the safety doors 35 and 36 may sometimes be opened to allow the resin discharged by purging to be removed from on the base frame 19, despite the hotness of the heating cylinder 6.

Figure 7:
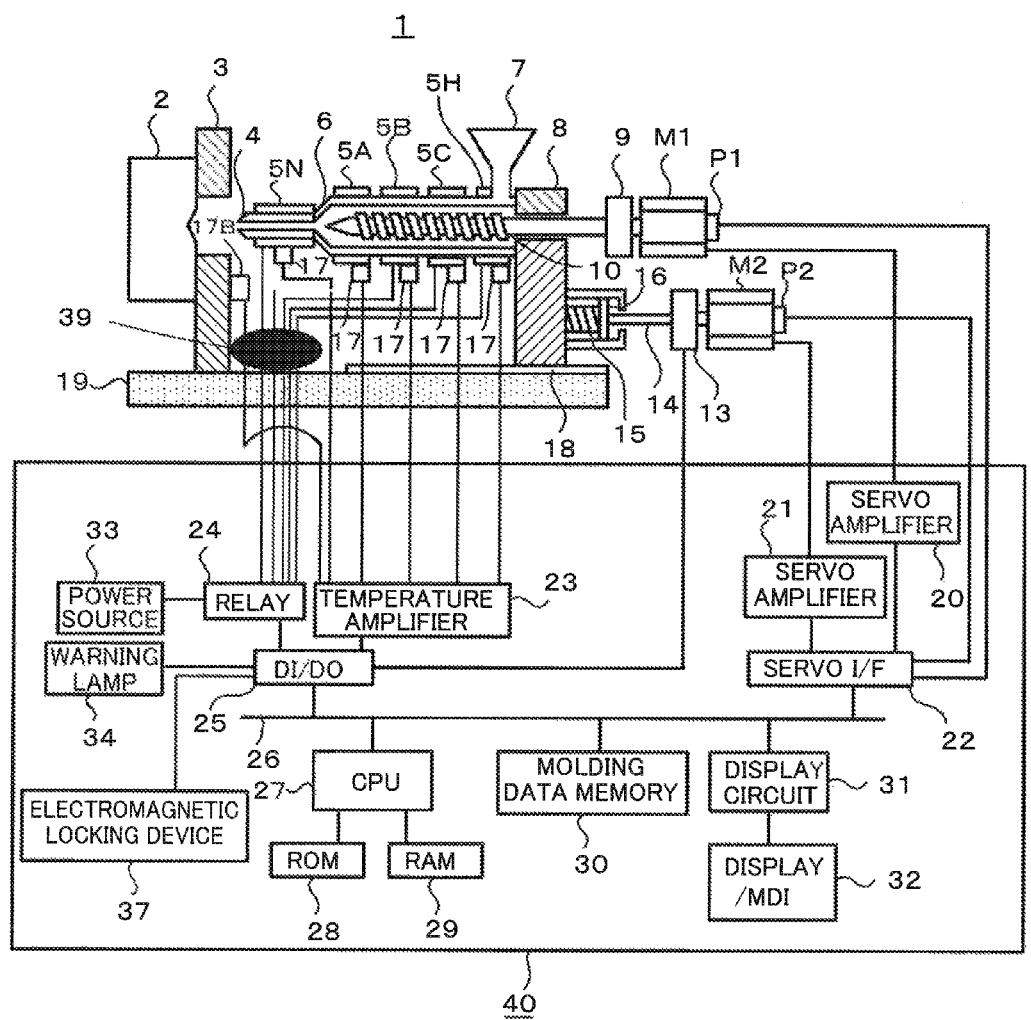
FIG. 7 is a diagram illustrating a resin discharged by purging.

An operator operates an unlocking button 38 for the safety doors on the operation screen displayed on the display/MDI 32, as shown in FIG. 5. Thereupon, the safety doors 35 and 36 are unlocked and allowed to open and close even if the heating cylinder 6 is hot. Thus, the operator can remove the resin accumulated on the base frame 19, that is, a resin 39 discharged by purging, as shown in FIG. 7. A switch (not shown) disposed on a control panel may be used as a unit configured to cancel the state in which the safety doors 35 and 36 are prohibited from opening. For the safety of the operator, moreover, the unlocking unit may be combined with another unlocking unit, such as a password.

As described above, there can be provided a safe injection molding machine in which the temperature monitoring device monitors the current temperature of the heating cylinder 6 or the nozzle 4 and prohibits the safety doors from opening if the heating cylinder 6 or the nozzle 4 is hot, thereby eliminating the possibility of an operator getting burned by touching the heating cylinder 6 or the nozzle 4 or a molten resin ejected from the nozzle 4.

The invention claimed is:

1. A temperature monitoring device for an injection molding machine with a heating cylinder covered by an openable shield, the temperature monitoring device comprising:
   a heating unit configured to heat the heating cylinder;
   a detecting unit configured to detect a current temperature of or around the heating cylinder;
   a storage unit configured to store a prohibited temperature at which the shield is prohibited from opening; and
   a prohibition unit configured to prohibit the shield covering the heating cylinder from opening if the detected current temperature exceeds the prohibited temperature.

2. The temperature monitoring device for an injection molding machine according to claim 1, comprising:
   a zone temperature detecting unit configured to set a plurality of zones over the heating cylinder and detect the current temperature for each of the zones: and
   an average temperature obtaining unit configured to obtain an average of current temperatures for the zones or around the heating cylinder: wherein
   the shield covering the heating cylinder is prohibited from opening if the average temperature exceeds the prohibited temperature.

3. The temperature monitoring device for an injection molding machine according to claim 1, comprising:
   a zone temperature detecting unit configured to set a plurality of zones over the heating cylinder and detect the current temperature for each of the zones: and
   a maximum temperature obtaining unit configured to obtain a maximum of current temperatures for the zones or around the heating cylinder: wherein
   the shield covering the heating cylinder is prohibited from opening if the maximum temperature exceeds the prohibited temperature.

4. The temperature monitoring device for an injection molding machine according to claim 1, wherein the temperature monitoring device issues a warning while the shield is being prohibited from opening.

5. The temperature monitoring device for an injection molding machine according to claim 1, wherein the temperature monitoring device issues a warning at the point in time when the shield is to be opened while the shield is being prohibited from opening.

6. The temperature monitoring device for an injection molding machine according to claim 1, comprising a unit configured to cancel the state in which the shield is prohibited from opening while the shield is being prohibited from opening.

\* \* \* \* \*